Nov. 20, 1962 T. S. JESS ET AL 3,064,802
KIT AND PACKAGING, MIXING AND DISPENSING
MEANS FOR MIXTURE INGREDIENTS
Filed July 25, 1960 2 Sheets-Sheet 1

*INVENTORS*
THURMAN S. JESS
MILTON J. MORRISETTE
BY EDWARD J. POITRAS

ATTORNEYS

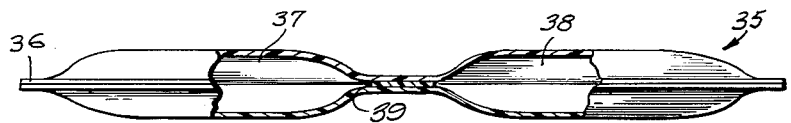
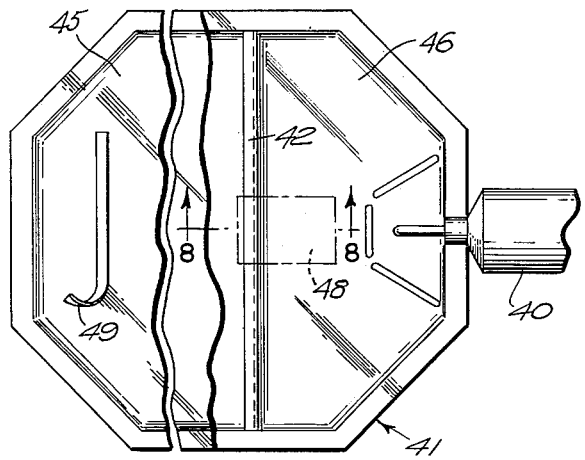
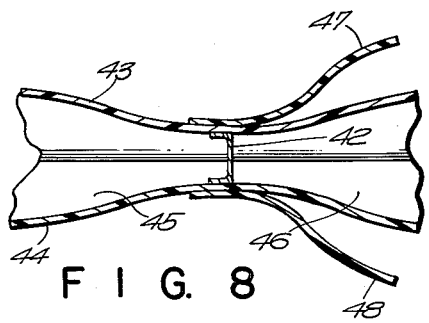
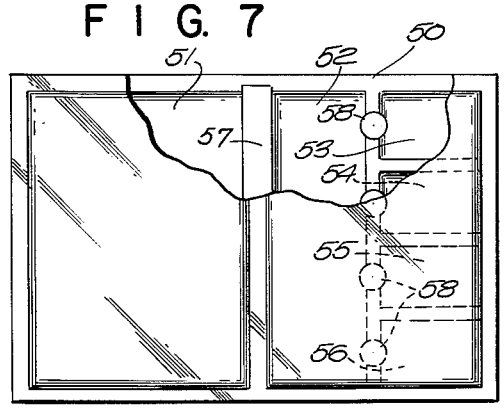
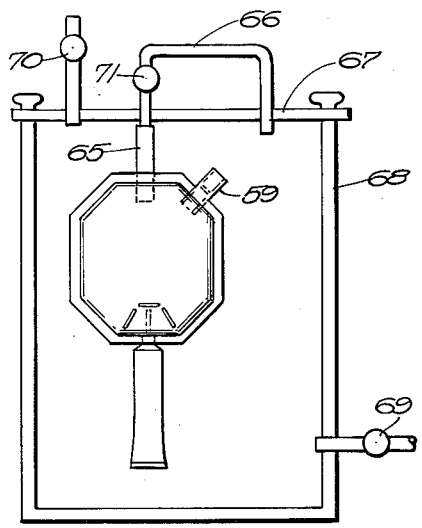
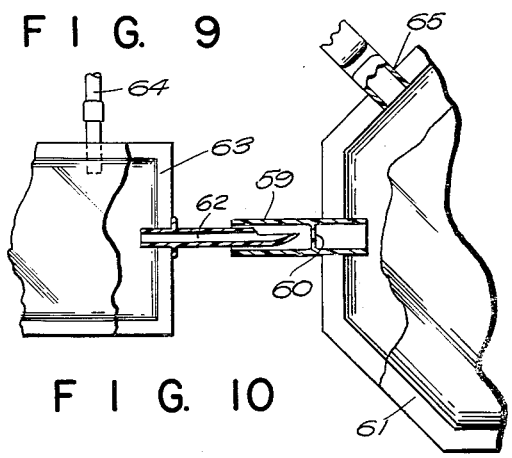

United States Patent Office 3,064,802
Patented Nov. 20, 1962

3,064,802
KIT AND PACKAGING, MIXING AND DISPENSING MEANS FOR MIXTURE INGREDIENTS
Thurman S. Jess, Holliston, Milton J. Morrisette, Ashland, and Edward J. Poitras, Holliston, Mass., assignors to Fenwal, Incorporated, Ashland, Mass., a corporation of Massachusetts
Filed July 25, 1960, Ser. No. 45,084
5 Claims. (Cl. 206—47)

This invention relates to means or apparatus for the unit or kit packaging of compound substances or materials of the activating type, or whose ingredients or components require separate manufacture and sealed storage, and are combined or activated only at the time and place of ultimate use. The invention aims to provide a kit or package for the handling, readying, and dispensing of such materials having compactness, structural and manufacturing simplicity and low cost. The invention apparatus affords also simple, uniform, and accurate measuring and mixing of the ingredients, and a unitary closed packaging initially dividing or isolating the ingredients but which may be readily manipulated from without for mixing without spilling of the same.

The invention apparatus is useful for example with epoxy resin, which for adhesive or bonding applications is combined or mixed with a curing or activating agent from which it is required to be held isolated or sealed off in storage, but with which it is to be combined or mixed just prior to use in accurate proportions and desirably without wasting or spilling.

The prior adhesive kits have employed a frangible glass ampoule as the chemically impervious container for the curing agent, and for that reason have been relatively costly and objectionably bulky and fragile. The present adhesive or similar kit or packaging means employs for housing the curing agent a container or tube which is durable, compact, and economical, which is quickly and easily sealed in manufacture, which may be mounted in an integral closed system combining also the resin container, and which may be manually manipulated or collapsed from without and for expressing the curing agent to the resin container of that integral closed system.

Figure 1:
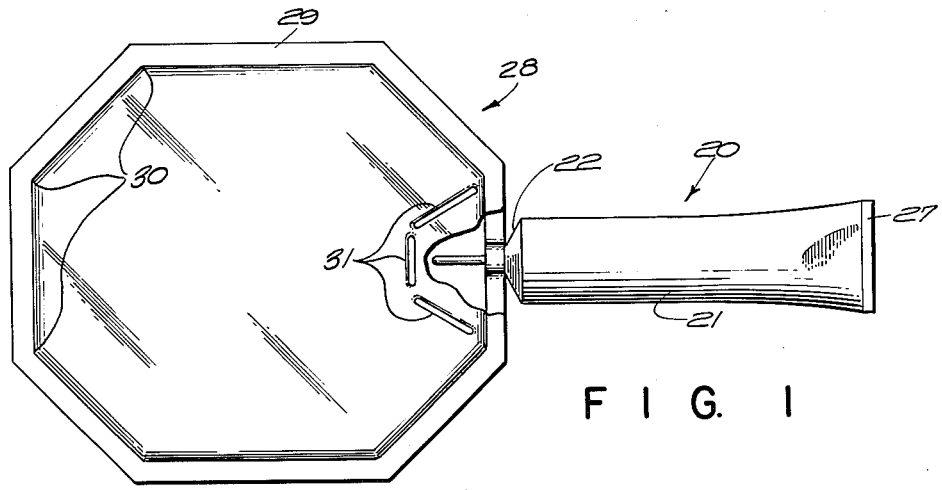
Figure 2:
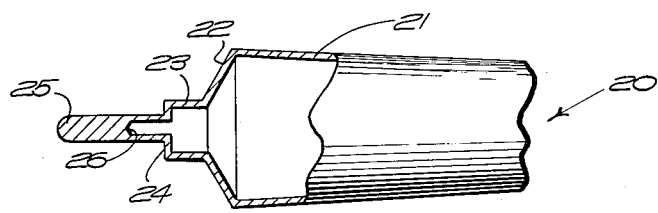
Figure 3:
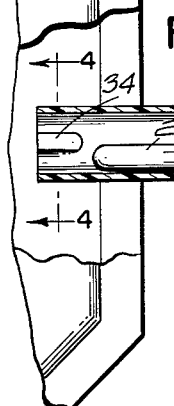
Figure 4:
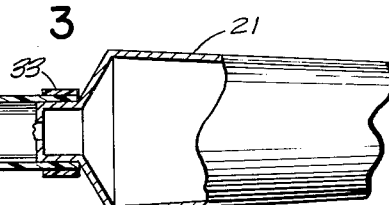
Figure 5:
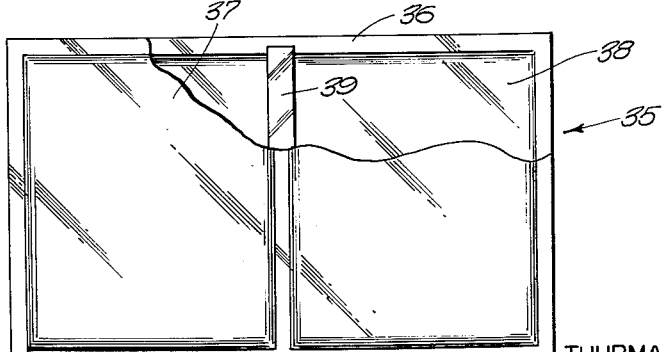

Other features and advantages of the invention apparatus will appear from the following description taken in conjunction with the accompanying drawings in which:
FIG. 1 illustrates one form of the invention apparatus;
FIG. 2 is a fragmentary, partly sectioned view on a larger scale of the outlet end of the tube of FIG. 1;
FIG. 3 shows an alternative form of the tube-bag connection;
FIG. 4 is a section along the line 4—4 of FIG. 3;
FIG. 5 is a plan of another embodiment of the invention apparatus;
FIG. 6 is a partly sectioned side view of the FIG. 5 form;
FIG. 7 is a plan of yet another form of the invention apparatus;
FIG. 8 is a section along the line 8 of FIG. 7;
FIG. 9 shows still another embodiment of the invention apparatus; and
FIGS. 10 and 11 show method and apparatus for packaging and dispensing manipulation of the invention kit.

The epoxy resin above mentioned as exemplary of the materials which the kit hereof may contain as a mixture ingredient will be understood for activating to be combined or mixed with curing agents of which at least some are toxic or caustic, and so require a container which is relatively impervious or chemically inert.

In the FIGS. 1–4 forms the invention kit comprises a closed collapsible tube 20 of a material which will contain or provide a chamber for the curing agents, including the toxic or caustic ones, indefinitely and at all practical temperatures, without being attacked chemically. The curing agent packaging means or tube 20 may be metal, for example tin, or for added strength an alloy of tin and copper, or, and depending on the curing agent, it may be plastic, as polyethylene, also polypropylene.

The curing agent storing tube 20 is comprised of a generally elongate, soft or flexible and collapsible body portion 21 merging at one end with a relatively stiff shoulder tapering to a reduced neck 23. The neck 23 is reduced at its outer end by an annulus or step 24 from which integrally depends or projects a generally solid straight stem or tip 25 which may be formed by the same impact extrusion or molding as the remainder of the tube 20, and so as to hermetically seal the dispensing end of the tube against any leakage thereat of the curing agent or other tube content. The tip 25 is seen to project sufficiently for ready grasping between and bending by the fingers, and to have a central axial recess 26 where it joins step 24, whereupon by manually flexing a few times and through a relatively small angle the tip is broken or torn free of or away from the tube and more particularly the step 24, leaving in that the dispensing opening shown in FIG. 3.

In manufacture the tube 20 is charged with the curing agent or other mixing or combining component or ingredient through its other and initially open end. Since some of the curing agents at least are highly "wetting" and of low viscosity, it is necessary that a positive or forcible closing or sealing be effected at the free or filling end of the tube 20. A tube of the herein specified tin or tin and copper alloy composition meets such requirement in that it may readily be flattened and folded as at 27, FIG. 1, and in this pressed so as to force the filled ingredient from between its folds. The tube end 27 may then be hermetically sealed by dipping into or otherwise contacting with solder or the like fusing or adhering agent, which is selected to be molten or flowable at a temperature below that at which the curing agent would be affected.

The FIG. 1 kit or packaging means further comprises a pack or pouch 28 for another ingredient of the compound mixture substance, such as the resin of the activating adhesive. For such resin at least the pouch 28 is desirably formed of tough flexible light weight sheet material such as a polyvinyl or similar synthetic plastic. Since for some applications it is required to exhaust or exclude air from the kit, the pouch 28 is conveniently made completely collapsible or lay flat, as herein by fabricating as an envelope or from mating juxtaposed sheets, which sheets are hermetically sealed by bonding or fusing together along their common peripheral margins 29.

Further to the FIG. 1 form, the pouch 28 has a round, hexagonal or similar shape or configuration whereby the interior angles at its apices 30 are as wide as possible and in any case substantially more than 90 degrees. By thus eliminating sharp corners from the resin pouch the trapping of the resin as formerly in right angle corners is prevented, while also the mixing of the resin with the curing agent is facilitated, and the combining more generally of these or other mixture ingredients is made more complete, accurate, and uniform.

In the FIG. 1 form tube 20 and pouch 28 are integrally joined by inserting and sealing the tube neck 23 between the pouch sheets at the margin 29.

Further in accordance with the invention, the pouch 28 is semi-partitioned by interrupted seal lines 31 to define a small cage or trap for the tube tip 25 when broken off. The openings left intervening between the lines 31 at which the juxtaposed pouch sheets are flatted and sealed will be understood to be small enough to prevent escape of the tube tip yet large enough for easy passage there-through of the ingredient from the tube for combining with the ingredient of and in the much larger body portion of the pouch.

In the FIGS. 3 and 4 form the tube 20 and pouch 28 are integrally joined for communicating through a tube 32 which may be of the similar flexible plastic material as the pouch, and which extends at one end through a wall of the pouch for sealing to the conformantly surrounding margin 29. The other tube 32 end is seen as received over the neck 23 of tube 20, to which it may be variously seized as by a constricting elastic band 33 expanded over the same, and/or by a suitable adhesive applied between the tube 32 and neck 23, desirably after first sand blasting or otherwise roughing the neck 23.

For blocking the passage of tip 25, when broken off as shown in FIG. 3, out of the tube 32 and into pouch 28 the tube has an internal obstruction 34 which reduces the tube passage or opening to a width less than that of the tip. Such obstruction 34 is conveniently and herein afforded by clamping and sealing together the opposite tube walls so as to form an intermediate tube dividing constriction as best seen from FIG. 4.

In the manufacture of the invention apparatus for the kit packaging of the adhesive mix, for example, the measuring of the curing agent and resin ingredients of that mix which are to be charged into the tube 20 and pouch 28 respectively is done at the factory, and that accurately, automatically, and in any quantity. In this described filling of the kit it may be preferred to introduce air into the pouch with the resin, as to facilitate mixing, or it may be desired to completely exclude the air, as to avoid bubbles in the cured resin. Further, the resin may be optionally mixed with one or more of such additional ingredients as fillers and pigments, along with the combining with the curing agent. But whatever the ingredients and with the measuring done at the factory, all that is required in the way of use manipulation of the apparatus, to achieve uniformity of the resulting adhesive, is to knead sufficiently the ingredients, which it will be appreciated is an unskilled operation as compared with the measuring out of the ingredients as formerly required of the user in the field.

To mix the active ingredients in the field on short notice, without measuring, in any and just the desired quantities, and so without the waste of an excess which cannot be used within the "pot life" of the activated resin, the user needs simply engage tip 25 through the walls of bag 28 or tube 32 and flex or stress it in one and the opposite direction a few times to break it off as shown in FIG. 3. The tube 20 may then be squeezed, and more particularly its body 21 collapsed and rolled up at the end 27, to express all its measured quantity of curing agent to the pouch 28.

The ingredients are then mixed by kneading of the pouch 28 to a uniform consistency of the resulting adhesive, and in this it will be observed that there is no personnel hazard from the open mixing by stirring of active or toxic ingredients, the said ingredients being held safely sealed with the unitary closed kit throughout such mixing by kneading.

For the ultimate use or applying of the adhesive the kit of FIG. 1 need merely be cut open as at any corner 30 and the pouch 28 squeezed to express the contents at the dispensing exit thus provided. It should be noted that the problem of toxicity is again removed during such dispensing, in that the toxic curing agents are by then mixed with and so held in and diluted by the relatively inert resin.

It will be understood that in the FIGS. 1–4 forms the kit may comprise one or more than one of the tubes 20 constructed and coupled to the pouch 28 in the similar manner. Additional tubes may be provided to supply, for example and in addition to the curing agent, pigments for variously coloring the resin. Or different measured amounts of the suring agent may be contained in two or more of the supply tubes, for selective use under operating or use conditions which may differ widely as to temperature, curing time, or otherwise. For example, a smaller tube might be used at high temperature or long curing time, a larger tube at medium temperature or curing time, and both tubes together at low temperature or short curing time.

It will be understood more generally that curing agents, fillers, accelerators, pigments, and the like may be employed in any desired combination, in the compound or mixture substances or materials to which the invention apparatus or kit is suited, by the mentioned provision and selective use of one or more than one of the chemically inert or impervious tubes 20.

Some at least of the curing agents are known to be storable in plastic film, for a useful time or through a normal shelf life, without deterioration. Moreover it may happen that the curing agent is employed in conjunction with a resin which is compatible with the same plastic material.

Various compound substances and in the above instances the activating resin mixtures may be packed also in the apparatus of FIGS. 5–6 wherein the adhesive kit comprises a flexible plastic bag or pouch 35 collapsibly formed like the pouch 28 from mating juxtaposed sheets which are flatwise opposed and dielectrically or heat-sealed at their common outside or peripheral margins 36. In accordance with the invention the pouch 35 is intermediately divided into resin and curring agent chambers, as the chambers 37, 38 by interposing means such as flat strip 39 of a material, say aluminum foil, to which the pouch walls may be made to adhere with a wide and predictable range of tenacity, thereby affording a seal whose degree of strength of adhesion is controlled by the choice or selection of the material used in, and independently of the extent or intensity of heating of, the sealed structure.

Again, the novel intermediate dividing and sealing means here concerned and having exemplary illustration as the strip 39 will be understood to embrace also any suitable coating, such as an appropriately evaporated aluminum coating, which may be applied to the opposite inside walls of the plastic sheets at any intermediate or dividing band or zone. The pouch walls may be sealed at such inserted coating or strip means in conjunction with or by the same sealing operation as the margins 36. But as just mentioned the tenacity of the adhesion of the pouch walls to the intervening coating or to the interposed strip will be independent of the degree of heat sealing of the margins, may be closely controlled by appropriate selection of the material used for the coating or strip, and so will be uniform from one unit to the next.

The degree of the tenacity of adhesion at the pouch walls to such intermediate or dividing means will of course be predeterminedly less than the tear strength of the plastic walls themselves, at the margins 36 and elsewhere, whereby the pouch may readily be kneaded or distorted to break or fracture the intermediate or dividing seal and so open between the ingredient chambers without opening also the pouch proper.

As already pointed out it is for some applications desirable to incorporate more than two ingredients in the adhesive mix. For example the kit may combine the resin, the curing agent, and a filler such as employed to alter the mechanical properties of the activated resin. Such filler may typically be chopped glass fibers, or patches of woven fiberglass. With the filler combining adhesive mixtures it is desirable to package the filler in a separate compartment, for the reason that if the filler were initially combined directly with the resin it would, at least in some cases, make the resin so hard to knead that it becomes difficult if not impossible to thoroughly mix or uniformly distribute the curing agent.

The kit of FIGS. 7 and 8 is well suited to such filler combining adhesive mixture in that it comprises a tube 40 formed and coupled similarly as in FIG. 1 to a pouch 41 which is seen as divided to define with such tube three closed sealed compartments.

The bag or pouch 41 is provided more particularly with an intermediate partition or dividing wall 42 formed from a thin strip of the plastic which is intermediately normal to and at its longitudinal margins folded and sealed to the thus spaced pouch side walls 43, 44, FIG. 8, thereby defining in the pouch 41 filler and resin chambers 45, 46. For opening between the said filler and resin chambers 45, 46 there are provided at opposite sides of the pouch pull-apart strips or tabs 47, 48, FIG. 8 which are sealed at their one ends to the pouch walls 43, 44 so as to overlie the dividing wall 42, and which project freely at their other ends whereby they may be grasped and manipulated and more particularly pulled apart to tear and so open through the thinner and hence relatively more fragile partition wall 42.

The pouch of FIG. 7 further has an alternative means for providing an outlet opening, as for applying the readied adhesive, and comprising a tear-open strip 49 of the plastic material, which is firmly secured as by fusing to the pouch over its major length, and which has a projecting portion or end as shown in FIG. 7, by which it may be grasped and pulled to tear a dispensing opening in the pouch wall. It will be understood that by forming or cutting the tear strip 49 from a plastic material or sheet thicker than that employed for the walls 43, 44 of the pouch 41, and by integrally joining as by fusing the strip to said pouch wall, it may be assured that when pulled away from the pouch the strip 49 tears out the thinner pouch wall section to which it is attached, thus leaving a dispensing opening as determined by the size and placement of the integrally joined portion of the tear strip.

In the FIG. 7 form also the tube 40 is seen as joined directly to the pouch 41 similarly as in the FIGS. 1 and 2 form. This arrangement will be understood as particularly advantageous for those adhesive mixes in which the proportions of the ingredients are critical, in that there is no possibility of trapping curing agent as in the tube 32 of FIG. 3, and such as might vary the mixing quantity of the curing agent.

Where all of the mixture ingredients are compatible with a given plastic the adhesive kit may be of the form shown in FIG. 9, and comprise more particularly a unitary plastic bag or pouch 50 which is interiorly partitioned or divided into a plurality of chamber. For example there may be a filler chamber 51, a resin chamber 52, pigment chambers 53, 54 and curing agent chambers 55, 56. For removably closing between the filler and resin chambers 51, 52 of FIG. 9 there is provided an aluminum foil strip 57 to which the pouch walls are adhered with controlled tenacity and from which they may be pulled apart as hereinbefore described. The partitions between the other or pigment and curing agent chambers 53—56 are fashioned for opening from without by interposing and flat sealing the pouch walls to a destructible barrier means consisting of aluminum foil or other metal or plastic discs or coatings 58 from which the pouch walls may be pulled free in the manner already described, and to provide exit openings through which the initially separate adhesive ingredients may be expressed for desired mixing.

Additionally to the optional use of interposed destructible coatings, strips, discs or the like, the destructible barrier means 58 may comprise a region of substantially weaker sealing of the plastic pouch walls directly one to the other. With certain plastics the desired compromise in sealing strength, that is, a seal substantially weaker than the peripheral seals yet strong enough to withstand normal handling, may be achieved by selectively impressing on the sealing dies short high voltage pulses. In other cases the differentiated or weaker sealing of the destructible barriers may be achieved with normal sealing by heated bars, which may for the purpose be appropriately or differently controlled as to operating time, temperature, and pressure.

Thus in the FIG. 9 form the invention kit is characterized as a multi-compartment container with very strong outer seals but with weaker seals between the individual compartments, so that the mixture ingredients may be joined at the time chosen by the user.

Another form of dispensing outlet from the pouch is shown in FIG. 10 as a length of plastic tubing 59 sealed at one end through the peripheral wall or margin of the pack and which is closed by a puncturable membrane or diaphragm 60, whereby the pouch 61 may be opened for dispensing of the adhesive by insertion past the membrane 60 of the point of a stiff coupler 62. The cannula-openable outlet port shown in FIG. 10 is suited to such applications as electronic "potting," wherein the other end of the coupler 62 may be received through the end of a rigid chamber 63 such as employed for housing the electronic assembly to be encapsulated, and which may as commonly be first evacuated through a vacuum line 64.

It will be understood that in such encapsulating and for like applications it is desired to fill the adhesive-containing space solidly, with no voids. This requires of course that no air be introduced into the space from the invention kit, along with the supplying of the adhesive or the like.

To that end the kit may under the invention and following charging of the pouch with the resin be evacuated as shown in FIG. 11. More particularly, the kit is coupled as by a port tube 65 to a U-tube 66 passed reversely through the removable cover 67 of a vacuum chamber 68, the latter having also an evacuating line 69 and a venting line 70. The U-tube 66 is seen also to have a restriction or valve 71 by which it may be assured that a higher degree of vacuum is maintained in the vacuum chamber 68 than in the adhesive pouch, so that there is no possibility of unwanted compression of the pack such as might force or expell the contained resin up into the connecting tube.

In the operation of the FIG. 11 apparatus for degassing of the adhesive kit, the kit is first pressed on to the tube 66 by its port tube 65 as shown, and the vent 70 and shut-off valve 71 are closed. The chamber 68 is then evacuated by applying line 69 to a vacuum source until the desired degree of vacuum has been attained, the exhausting of the pouch being controlled by manipulation of the valve 71. Following that vacuum line 69 is closed off, the pouch valve 71 is shut off, the vent valve 70 is opened, and the cover 67 is removed. Finally the evacuating port 65 is closed, as by clamping or heat sealing, FIG. 10.

There is thus produced a pack from which, within desired or controlled limits, all gas or vapor has been excluded.

The evacuating port 65 will be understood to be employed in combination with the dispensing outlet 59 as shown also in FIG. 11 and which is manipulated in use as heretofore described.

Our invention is not limited to the particular embodiments thereof illustrated and described herein, and we set forth its scope in our following claims.

We claim:

1. A kit for packaging compound substances comprising a closed collapsible bag of a flexible material compatible with one ingredient of a compound substance, a measured quantity of that one ingredient sealed in the bag, a closed collapsible tube of a material compatible with another ingredient of the substance, a measured quantity of that other ingredient sealed in the tube, a break-away outlet on said tube, said outlet comprising a flexible stem projecting integrally of the tube and recessed at its base whereby upon the flexing to the point of breaking away of said stem a dispensing opening is left in the tube, the tube mounted with said outlet in closed communication with said bag, said tube adapted upon the breaking away of said stem to be manually manipulated to express said other ingredient through said outlet and into said bag, and said bag interiorly semi-partitioned by interrupted seals of its juxtaposed walls around said outlet, the spacing of said seals being such as to trap said stem while allowing pass-through of said other ingredient for mixing with said one ingredient in said bag.

2. A kit for packaging compound substances comprising a closed collapsible bag of a flexible material compatible with one ingredient of a compound substance, said bag evacuated and sealed with a measured quantity of said one ingredient therewithin, a closed collapsible tube of a material compatible with another ingredient of the substance, a measured quantity of that other ingredient sealed in and completely filling the tube, said tube having an outlet closed by a break-away stem, the tube mounted with said outlet in closed communication with said bag, said tube adapted upon the breaking away of said stem to be manually manipulated to express said other ingredient through said outlet and into said bag, and the kit formed intermediate said outlet and said one ingredient with an interior passage proportioned to trap said break-away stem while allowing pass-through of said other ingredient for mixing with said one ingredient in said bag.

3. A kit for packaging compound substances comprising a closed collapsible bag of a flexible material compatible with one ingredient of a compound substance, a measured quantity of that one ingredient sealed in the bag, one or more strip means integrally joined at one end to said bag and at the other end projecting for grasping and pulling to tear a dispensing opening in the bag, a closed collapsible tube of a material compatible with another ingredient of the substance, a measured quantity of that other ingredient sealed in the tube, said tube having an outlet closed by a break-away stem, the tube mounted with said outlet in closed communication with said bag, said tube adapted upon the breaking away of said stem to be manually manipulated to express said other ingredient through said outlet and into said bag, and the kit formed intermediate said outlet and said one ingredient with an interior passage proportioned to trap said break-away stem while allowing pass-through of said other ingredient for mixing with said one ingredient in said bag.

4. A kit for packaging compound substances comprising a closed collapsible bag of a flexible material compatible with one ingredient of a compound substance, a measured quantity of that one ingredient sealed in the bag, said bag having a configuration such that the included angle at any corner is substantially greater than 90 degrees whereby trapping of the ingredient at such corner is prevented, a closed collapsible tube of a material compatible with another ingredient of the substance, a measured quantity of that other ingredient sealed in the tube, said tube having an outlet closed by a break-away stem, the tube mounted with said outlet in closed communication with said bag, said tube adapted upon the breaking away of said stem to be manually manipulated to express said other ingredient through said outlet and into said bag, and the kit formed intermediate said outlet and said one ingredient with an interior passage proportioned to trap said break-away stem while allowing pass-through of said other ingredient for mixing with said one ingredient in said bag.

5. A kit for packaging compound substances comprising a closed collapsible bag of a flexible material which is both tough and durable and readily severable whereby it may be cut open for dispensing, said flexible material also compatible with one ingredient of a compound substance, a measured quantity of that one ingredient sealed in the bag, a closed collapsible tube of a material compatible with another ingredient of the substance, a measured quantity of that other ingredient sealed in the tube, said tube having an outlet with a break-away stem, the tube mounted with said outlet in closed communication with said bag, said tube adapted upon the breaking away of said stem to be manually manipulated to express said other ingredient through said outlet and into said bag, and the kit formed intermediate said outlet and said one ingredient with an interior passage proportioned to trap said stem while allowing pass-through of said other ingredient for mixing with said one ingredient in said bag.

References Cited in the file of this patent

UNITED STATES PATENTS

| 1,971,843 | Alilaire | Aug. 28, 1934 |
| 2,893,547 | Earl | July 7, 1949 |
| 2,916,197 | Detrie | Dec. 8, 1959 |
| 2,932,385 | Bollmeier | Apr. 12, 1960 |

FOREIGN PATENTS

| 1,124,161 | France | June 25, 1956 |
| 1,241,250 | France | Aug. 5, 1959 |
| 451,170 | Canada | Sept. 14, 1948 |